United States Patent
Martin

(10) Patent No.: US 8,935,705 B2
(45) Date of Patent: Jan. 13, 2015

(54) EXECUTION OF HIGHLY CONCURRENT PROCESSING TASKS BASED ON THE UPDATED DEPENDENCY DATA STRUCTURE AT RUN-TIME

(75) Inventor: Jeremy D. Martin, Hanahan, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 4 days.

(21) Appl. No.: 13/107,634

(22) Filed: May 13, 2011

(65) Prior Publication Data

US 2012/0291045 A1     Nov. 15, 2012

(51) Int. Cl.
*G06F 9/46* (2006.01)
*G06F 9/48* (2006.01)
*G06F 9/44* (2006.01)

(52) U.S. Cl.
CPC ............... *G06F 9/4843* (2013.01); *G06F 8/75* (2013.01)
USPC .......................................... 718/106; 718/102

(58) Field of Classification Search
CPC ....................................................... G06F 8/75
See application file for complete search history.

(56) References Cited

U.S. PATENT DOCUMENTS

| | | | |
|---|---|---|---|
| 6,163,878 A | 12/2000 | Kohl | |
| 6,449,603 B1 | 9/2002 | Hunter | |
| 6,604,135 B1 | 8/2003 | Rogers et al. | |
| 6,826,597 B1 | 11/2004 | Lonnroth et al. | |
| 7,330,847 B2 | 2/2008 | Saylor et al. | |
| 7,353,249 B2 | 4/2008 | Takahashi | |
| 7,483,940 B2 | 1/2009 | Chen et al. | |
| 7,509,374 B2 | 3/2009 | Trinh et al. | |
| 7,730,082 B2 | 6/2010 | Sah et al. | |
| 7,792,836 B2 | 9/2010 | Taswell | |
| 7,822,860 B2 | 10/2010 | Brown et al. | |
| 8,010,567 B2 | 8/2011 | Subramanyam et al. | |
| 8,107,452 B1 | 1/2012 | Upadhyay et al. | |
| 2002/0143821 A1 | 10/2002 | Jakubowski | |
| 2003/0177112 A1 | 9/2003 | Gardner | |

(Continued)

FOREIGN PATENT DOCUMENTS

| | | |
|---|---|---|
| JP | 2001265799 | 9/2001 |
| KR | 10-0241646 B1 | 2/2000 |

(Continued)

OTHER PUBLICATIONS

Marsman, Jennifer. "Visual Studio 2010: How to understand your code using Dependency Graphs, Sequence Diagrams, and the Architecture Explorer". MSDN.com. May 11, 2010.*

(Continued)

*Primary Examiner* — Meng An
*Assistant Examiner* — Caroline H Arcos
(74) *Attorney, Agent, or Firm* — Stoel Rives LLP

(57) ABSTRACT

A dependency datastructure represents a processing task. The dependency datastructure comprising a plurality of components, each component encapsulating a code unit. The dependency datastructure may include dependency arcs to inter-component dependencies. Dependencies that are not satisfied by components within the dependency datastructure may be represented as pseudo-components. An execution environment identifies components that can be executed (e.g., have satisfied dependencies), using the dependency datastructure and/or concurrency state metadata. The execution environment may identify and exploit concurrencies in the processing task, allowing for multiple components to be executed in parallel.

19 Claims, 11 Drawing Sheets

(56) References Cited

U.S. PATENT DOCUMENTS

| | | |
|---|---|---|
| 2003/0196108 A1 | 10/2003 | Kung |
| 2004/0015701 A1 | 1/2004 | Flyntz |
| 2004/0015783 A1 | 1/2004 | Lennon et al. |
| 2004/0153908 A1 | 8/2004 | Schiavone et al. |
| 2004/0236824 A1 | 11/2004 | Millington et al. |
| 2005/0198120 A1 | 9/2005 | Reshef et al. |
| 2005/0216705 A1 | 9/2005 | Shibayama et al. |
| 2005/0240600 A1 | 10/2005 | Hill |
| 2005/0289342 A1 | 12/2005 | Needham et al. |
| 2006/0059567 A1 | 3/2006 | Bird et al. |
| 2006/0143040 A1 | 6/2006 | Scheier et al. |
| 2006/0144010 A1* | 7/2006 | Wolf ........................ 52/750 |
| 2008/0010233 A1 | 1/2008 | Sack et al. |
| 2008/0010590 A1 | 1/2008 | Curtis et al. |
| 2008/0040661 A1 | 2/2008 | Curtis et al. |
| 2008/0086436 A1 | 4/2008 | Zhao et al. |
| 2008/0127146 A1 | 5/2008 | Liao et al. |
| 2008/0222634 A1 | 9/2008 | Rustagi |
| 2008/0222694 A1 | 9/2008 | Nakae |
| 2009/0019386 A1 | 1/2009 | Sweetland et al. |
| 2009/0031225 A1 | 1/2009 | Toebes et al. |
| 2009/0089312 A1 | 4/2009 | Chi et al. |
| 2009/0100045 A1 | 4/2009 | Feng et al. |
| 2009/0300002 A1 | 12/2009 | Thomas et al. |
| 2010/0049687 A1 | 2/2010 | Patten et al. |
| 2010/0145720 A1 | 6/2010 | Reiner |
| 2010/0146593 A1 | 6/2010 | Stahl et al. |
| 2010/0169887 A1* | 7/2010 | Waas ........................ 718/102 |
| 2010/0169966 A1 | 7/2010 | Yalamanchi et al. |
| 2010/0287158 A1 | 11/2010 | Toledano et al. |
| 2011/0093937 A1 | 4/2011 | Mantle et al. |
| 2011/0126281 A1 | 5/2011 | Ben-Zvi et al. |
| 2011/0161847 A1 | 6/2011 | Chaikin et al. |
| 2011/0321051 A1 | 12/2011 | Rastogi |
| 2012/0102050 A1 | 4/2012 | Button et al. |
| 2012/0278700 A1 | 11/2012 | Sullivan et al. |
| 2013/0036351 A1 | 2/2013 | King et al. |
| 2014/0040445 A1 | 2/2014 | Beckert et al. |

FOREIGN PATENT DOCUMENTS

| | | |
|---|---|---|
| WO | WO01/09831 A2 | 2/2001 |
| WO | WO 01/25882 A1 | 4/2001 |

OTHER PUBLICATIONS

International Search Report and Written Opinion for PCT/US2012/026466 filed Feb. 24, 2012, and mailed Sep. 27, 2012, 10 pgs.

Notice of Allowance and Fee(s) due for U.S. Appl. No. 12/573,573 filed Oct. 5, 2009, and mailed from the USPTO Dec. 3, 2012, 15 pgs.

Final Office Action for U.S. Appl. No. 12/943,765 filed Nov. 10, 2010, and mailed from USPTO Mar. 7, 2013, (31 pgs.).

Notification of First Office Action for Chinese Patent Application No. 200980126895.0, issued Mar. 29, 2013.

Non-final Office Action for U.S. Appl. No. 13/452,580, filed Apr. 20, 2012, and mailed Sep. 5, 2013, 25 pgs.

Non-Final Office Action for U.S. Appl. No. 13/299,112, filed Nov. 17, 2011, and mailed from the USPTO on Jul. 3, 2014, 34 pgs.

International Preliminary Report on Patentability for PCT/US2012/026466 filed Feb. 24, 2012, and mailed from the International Bureau on Nov. 28, 2013, 7 pgs.

Final Office Action for U.S. Appl. No. 13/452,580, filed Apr. 20, 2012, and mailed from the USPTO on May 20, 2014, 27 pgs.

Fielding, R., et al., RFC 2616 Hypertext Transfer Protocol—HTTP/1.1, https://tools.ietf.org/html/rfc2616, 1999, pp. 35-36.

* cited by examiner

US 8,935,705 B2

EXECUTION OF HIGHLY CONCURRENT PROCESSING TASKS BASED ON THE UPDATED DEPENDENCY DATA STRUCTURE AT RUN-TIME

TECHNICAL FIELD

This disclosure relates to concurrent processing and, in particular, to registration and execution of highly concurrent processing tasks.

DETAILED DESCRIPTION

Figure 1:
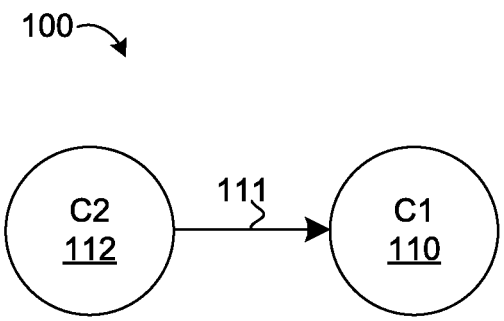
FIG. 1 depicts one example of a dependency datastructure.

Many processing tasks include unexploited concurrencies. As used herein, a "concurrency" refers to two or more processing tasks that can operate concurrently or in parallel (e.g., have no interdependencies therebetween). Developers may not take full advantage of potential concurrencies due to the difficulties involved in their exploitation. Typically, developers have to identify concurrencies a priori, at design time, author custom code (e.g., multi-threading and/or inter-thread communication), and so on, which imposes a high cost, and introduces potential problems into the resulting system. Therefore, what is needed is a systematic and efficient approach for registering processing concurrencies and an execution manager configured to efficiently exploit those concurrencies.

In some embodiments, processing tasks are arranged into independent "code units." As used herein, a "code unit" or "unit of code" refers to a logically distinct set of machine-executable instructions. A code unit may be part or component of a larger processing task. Code units may be embodied on a non-transitory, machine-readable storage medium, such as hard disks, non-volatile storage, optical storage media, or the like. Code units may be loaded from the non-transitory storage medium for execution by a computing device, such as a general-purpose processor, application-specific integrated circuit (ASIC), field-programmable gate array (FPGA), or the like.

Dependencies may exist between code units; for example, an output of a first code unit may be required input of a second code unit. These dependencies may be registered in a dependency datastructure. As used herein, a dependency datastructure refers to a datastructure in which inter-code unit dependencies are registered. A dependency datastructure may be implemented as a graph, such as a directed acyclic graph (DAG), a tree, an array, or any suitable datastructure. Code units may be represented as "components" within the datastructure. As used herein, a component is a node in a dependency datastructure that encapsulates and allows invocation of a code unit. Dependencies between code units may be represented as connections between components in the datastructure. As used herein, a dependency occurs when an output of a first code unit is used to form the required input of another code unit. In the datastructure, a "dependent component" refers to a component that requires the output of another component. Conversely, an "independent" code unit refers to a code unit that does not require the output of another component. Inter-component dependencies may be represented as connections (e.g., arcs) between components.

In some embodiments, an execution manager implements the processing tasks defined by the dependency datastructure. The execution manager identifies components that can be executed using the dependency datastructure (e.g., identifies components whose dependencies are satisfied). In some cases, a code unit may have a dependency that is satisfied by an "external" entity (an entity other than the execution manager). For example, a component may depend on the output of a separate I/O processing system, the output of a remote processing task, or the like. The external entity may be represented in the dependency datastructure as a "pseudo-component." As used herein, a pseudo-component represents a dependency outside of the dependency datastructure that cannot be satisfied by another component within the datastructure (or the execution manager). Conversely, dependencies on other components of the dependency datastructure (e.g., "internal components" of the datastructure) can be resolved by the execution manager executing the code unit associated with the component.

As used herein, an "explicit pseudo component" refers to a pseudo-component that is added to the dependency datastructure explicitly by a developer or other entity. An "implicit pseudo component" refers to a pseudo-component that is automatically added to a dependency datastructure (or substituted for an existing component in the datastructure) in certain situations, such as when the component is designated as an entry component of a sub-graph (discussed below).

FIG. 1 depicts one example of a dependency datastructure 100. The datastructure 100 may be embodied on a non-transitory, machine-readable storage medium, such as a hard disk, non-volatile memory, optical storage medium, or the like. The datastructure 100 may also be communicated over a communications network, such as an Internet Protocol (IP) network, wireless network, or the like.

In the FIG. 1 example, the datastructure 100 comprises a DAG; however, the disclosure is not limited in this regard and could be adapted to use any suitable datastructure. The datastructure 100 includes an independent component 110, which represents a code unit with no dependencies on other code units in the datastructure 100. The dependent component 112 depends on an output of the component 110. This dependency is represented as a dependency arc 111 between component 110 and component 112. The "direction" of the dependency arc 111 indicates that an output of the component 110 is a required input of the component 112.

The "direction" of the dependency arc 111 indicates that the code unit of component 112 may not be executed until the required output is produced by the component 110. The arc 111 may include metadata describing the dependency, such as a name, data type, interface definition (e.g., Application Programming Interface (API), call-back registration, etc.), "direction" of the dependency, or the like.

Figure 2:
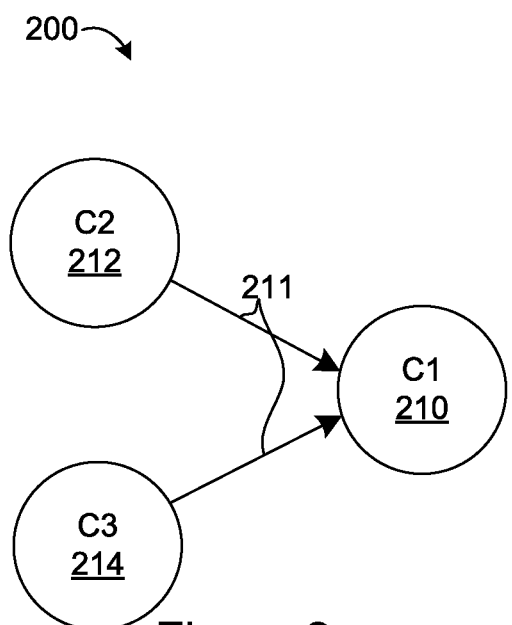
FIG. 2 depicts another example of a dependency datastructure.

FIG. 2 depicts another example of a dependency datastructure 200 in which an output of an independent component 210 is required by multiple dependent components 212 and 214. The dependencies are represented by the dependency arcs 211 between the component 210 and the components 212 and 214. As described above, the arcs 211 may include metadata pertaining to the nature of the dependency.

Figure 3:
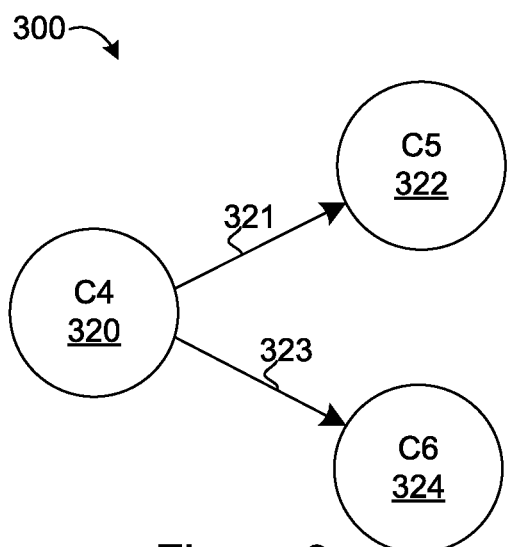
FIG. 3 depicts another example of a dependency datastructure.

In another example, depicted in FIG. 3, a dependency datastructure 300 comprises a component 320 that depends on outputs of multiple components (components 322 and 324). These dependencies are represented by respective dependency arcs 321 and 323.

Figure 4:
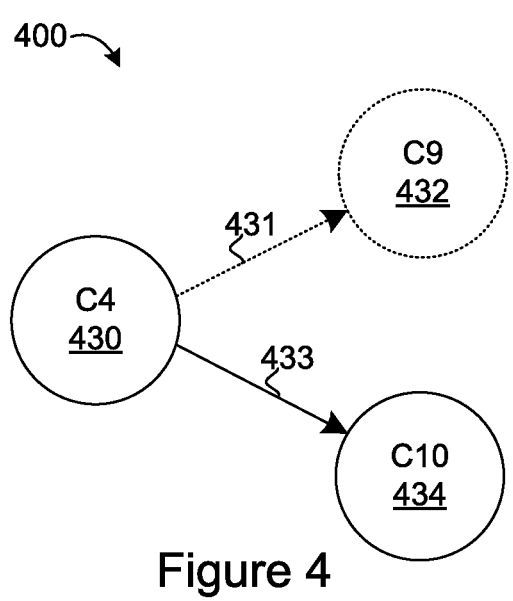
FIG. 4 depicts another example of a dependency datastructure.

FIG. 4 depicts an example of a dependency datastructure 400 that includes a pseudo-component (e.g., external dependency). In the FIG. 4 example, the component 430 depends on an output of an external, pseudo-component 432 (represented by dependency arc 431) as well an output of a "non-pseudo" component 434 (represented by dependency arc 433). As described below, the dependency 431 may be not resolvable by the execution manager of the dependency datastructure 400. Conversely, the dependency 433 may be resolved by the execution manager executing the code unit of the component 434 to generate the one or more outputs required by the component 430.

The dependency datastructures disclosed herein may comprise a number of different "generations." As used herein, a "generation" refers to the number of dependency arcs between components. A first generation may comprise independent components with no internal dependencies. A second generation may comprise components that depend on outputs from the first generation, and so on.

Figure 5A:
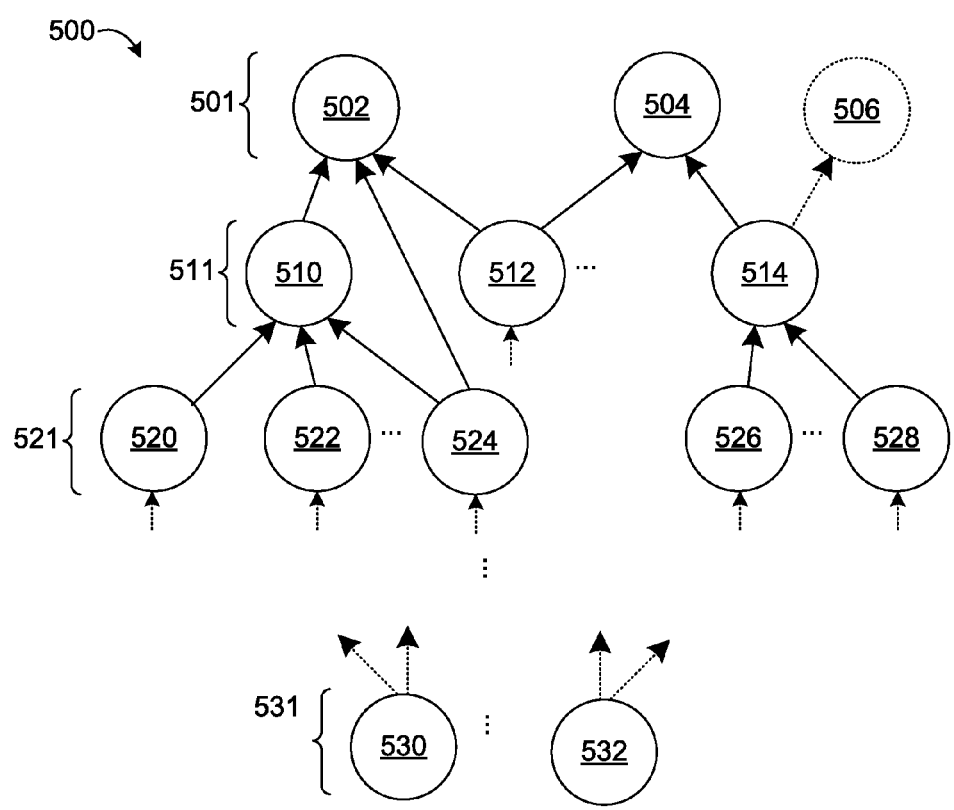
FIG. 5A depicts another example of a dependency datastructure.

FIG. 5A depicts a dependency datastructure 500 that includes a number of different generations. In the FIG. 5A example, the datastructure 500 includes independent components 502, 504, and 506, which may comprise a "first generation" 501 of the datastructure 500. The component 506 represents a pseudo-component.

A "second generation" 511 of dependent components (components 510, 512, and 514) requires outputs generated by components in the first generation (components 502 and/or 504). The component 512 depends on outputs of both 502 and 504.

A "third generation" 521 of components (including components 520, 522, 524, 526, and 528) requires outputs produced by components in the "second generation." Dependencies may, however, span multiple generations. As depicted in FIG. 5A, the component 524 requires outputs produced by the component 510, which is in the "second generation," as well as an output generated by the component 502, which is in the "first generation." Therefore, although referring to "generations" may be convenient when describing multi-level dependency datastructures, the actual dependencies between components in the datastructure 500 and/or concurrent execution of the code units associated with the components are not limited to neighboring generations.

The dependency datastructure 500 "terminates" with one or more "output" components 530 and 532 (in the "fourth generation" 531). As used herein, an "output" component refers to a component in a dependency datastructure that produces an output that is not required by other components in the datastructure. An output component may, therefore, refer to a component that produces an "output" of the dependency datastructure itself (e.g., an output of a processing task or sub-graph). In the FIG. 5A example, the components 530 and 532 may produce the "outputs" of the dependency datastructure 500.

The dependency datastructures described herein may be used to manage the concurrent execution of code units. In some embodiments, an execution manager (or other entity) accesses a dependency datastructure associated with a processing task. The execution environment identifies components that can be executed (e.g., have "satisfied" dependencies). Initially, the independent (e.g., leaf) components of the dependency datastructure may be executable. Execution of the independent (and other) components may satisfy the dependencies of other components in the dependency datastructure. As used herein, a "satisfied component" refers to a component that can be executed and/or a component whose required inputs are available.

The execution environment may maintain a "concurrency state" of a dependency datastructure. As used herein, the "concurrency state" of a dependency datastructure refers to a "run-time" representation of which components have been executed and/or which component outputs are available. The concurrency state of a dependency datastructure may be maintained in the dependency datastructure itself and/or in another separate datastructure. As the execution environment executes components in the dependency datastructure, the execution environment may update the concurrency state to identify a next set of satisfied components that can be executed.

Figure 5B:
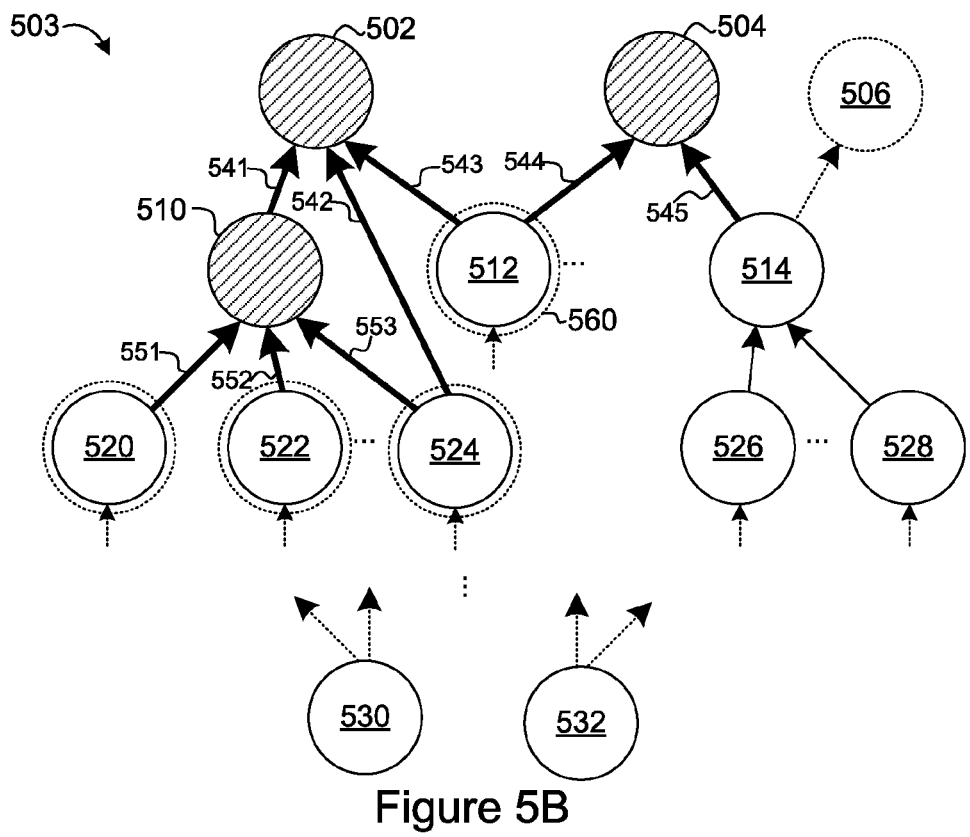
FIG. 5B depicts an example of a dependency datastructure and concurrency state metadata.

FIG. 5B depicts an example of a dependency datastructure (dependency datastructure 500 of FIG. 5A) that has been adapted to include concurrency state metadata. The concurrency state metadata indicates that components 502, 504, and 510 have been executed (depicted by the "fill" status of the components 502, 504, and 510). Alternatively, or in addition, the concurrency state metadata may comprise indications of which dependency arcs are satisfied (e.g., indicating that dependency arcs 541, 542, 543, 544, 545, 551, 552, and 553 are satisfied).

Using the dependency datastructure 503 and/or the concurrency state metadata, the execution environment (or other entity) may identify components that can be executed (components whose dependencies have been satisfied). The concurrency state metadata may maintain indications of the satisfied components. In the FIG. 5B example, the concurrency state metadata comprises respective indicators identifying the components that are "satisfied" and can be executed (e.g., components 512, 520, 522, and 524). The concurrency state metadata may also identify components whose dependencies have not been satisfied (e.g., components 514, 526, 528, 530, and 532).

As depicted in FIG. 5B, there may be more than one component available to be executed at a time. The dependency datastructure 503 (and concurrency state metadata) indicates that components 512, 520, 522, 524 can be executed. The execution of components 512, 520, 522, and/or 524 may occur in parallel (concurrently). The parallelism between the components 512, 520, 522, and 524 may be easily identified due to the representation of the code units in the dependency datastructure and the availability of concurrency state metadata.

As illustrated in FIG. 5B, the opportunities for concurrent operation depend on the order in which dependencies are satisfied. For example, the component 514 is not available for execution since its dependency on the output of pseudo component 506 is not yet satisfied. However, in other instances, the components may finish execution in a different order, resulting in a different concurrency state, and different sets of components being available for concurrent operation. The differences in concurrency state may be due to many different factors including, but not limited to: processing loads, communication latencies, I/O time, and the like. For example, the component 502 may correspond to an operation to access data in a database. In some cases (e.g., when the load on the database is light), this operation may complete relatively quickly. However, in other instances (e.g., when the database is heavily loaded), execution of the component may take longer relative to other components. The arrangement of the components into the dependency datastructure, along with maintenance of the concurrency state, allows real-time concurrencies to be exploited regardless of variable changes to the order and/or speed in which other components are executed.

Figure 5C:
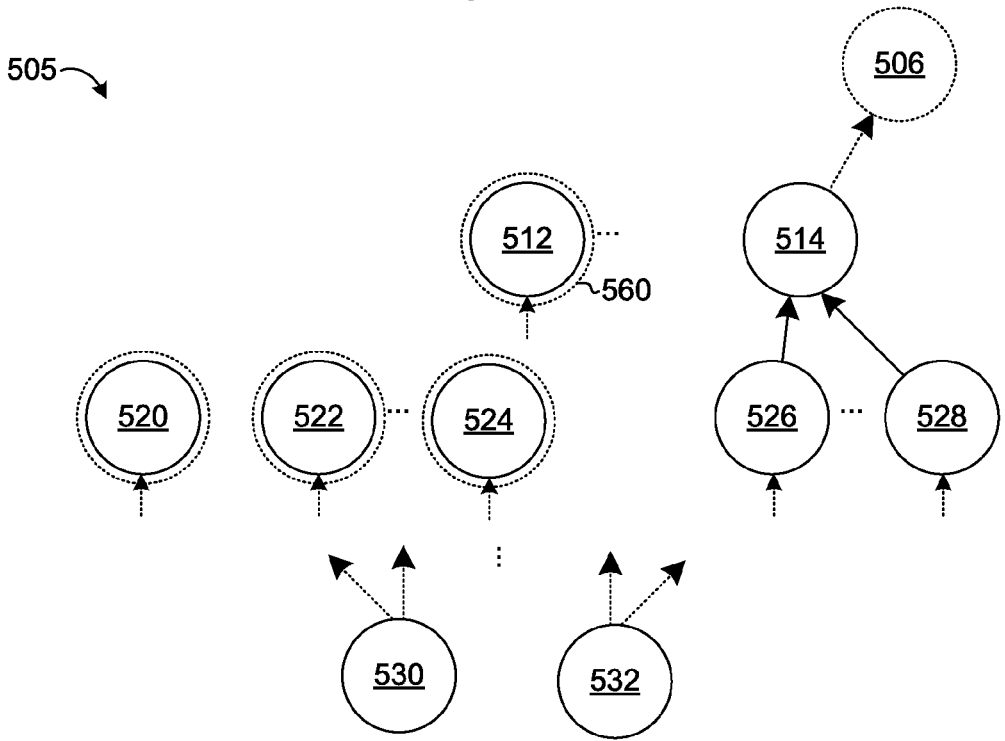
FIG. 5C depicts another example of a dependency datastructure and concurrency state metadata.

FIG. 5C depicts another example of a dependency datastructure comprising concurrency state metadata. In the FIG. 5C example, as components are executed, they are removed from the datastructure 505, along with the dependency arcs satisfied thereby. Accordingly, components that are available to be executed (e.g., components whose dependencies are satisfied), are identified as leaf nodes in the datastructure 505. Like FIG. 5B, FIG. 5C indicates that the components 502, 504, and 510 have been executed and that the outputs thereof are available to the other components in the datastructure. As such, these components and the corresponding dependency arcs (arcs 541, 542, 543, 544, 545, 551, 552, and 553 of FIG. 5B) have been removed from the datastructure 505.

Components that are available for execution (e.g., components whose dependencies have been satisfied) are identified as the leaf nodes in the datastructure 505. In some embodiments, the concurrency state metadata may further comprise respective indicators 560 as described above. Alternatively, components may be identified by traversing the datastructure 505 to identify the leaf nodes (e.g., independent of an explicit indicator 560).

Outputs generated by execution of the code units of the components in the dependency datastructures may be stored (e.g., cached) by the execution environment (or other entity) and made available as inputs to other, dependent components.

In some embodiments, a sub-graph may be extracted from a dependency datastructure. A sub-graph may include one or more components, including a "root" component and one or more "entry" components. The "root" component is dependent (directly or indirectly) on outputs produced by the entry components. The "entry" components are components that depend upon inputs generated from outside of the sub-graph. In some embodiments, a sub-graph is constrained such that the entry components exist on a path that originates from the root component. Accordingly, a sub-graph may be traversed from the root until all paths end in either a leaf component (a component with no dependencies) or an entry component. A sub-graph may be encapsulated by and/or exposed as a code unit, a component, or the like, and may be executed independently of the dependency datastructure from which it was extracted.

Figure 6A:
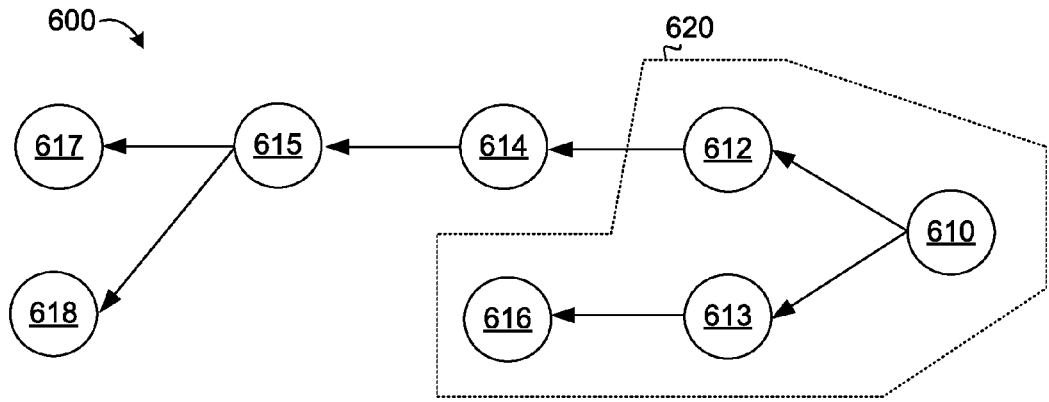
FIG. 6A depicts a dependency datastructure from which a sub-graph is extracted.
Figure 6B:
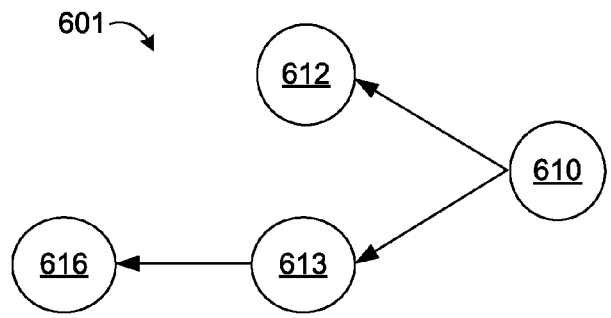
FIG. 6B depicts an example of a sub-graph.
Figure 6C:
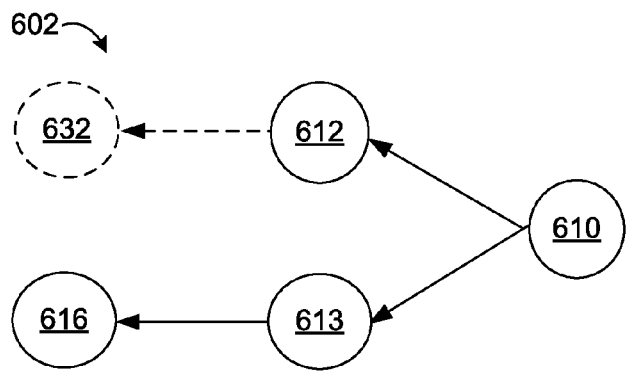
FIG. 6C depicts an example of a sub-graph comprising a pseudo-component.

FIG. 6A depicts one example of a dependency datastructure 600 from which a sub-graph may be extracted. The dependency datastructure 600 includes components 610, 612, 613, 614, 615, 616, 617, and 618, which may be interconnected by dependency arcs, as described above. A sub-graph 620 comprising a "root" component 610 and an entry component 612 may be extracted from the dependency datastructure 600. The components 613 and 616 may be included in the sub-graph to satisfy the dependencies of the root note 610. FIG. 6B shows the sub-graph 601 as extracted from the dependency datastructure 600. In some embodiments, the dependencies of entry components of a sub-graph may be represented as pseudo-components. FIG. 6C depicts a sub-graph 602 comprising a pseudo-component 632 representing the dependency of component 612.

As discussed above, pseudo-components, such as pseudo-component 632, represent external dependencies (dependencies that are not satisfied by components within a particular dependency datastructure or sub-graph). Therefore, the sub-graph (or execution environment implementing the sub-graph), may be responsible for mapping input/output data of the dependent components.

Figure 6D:
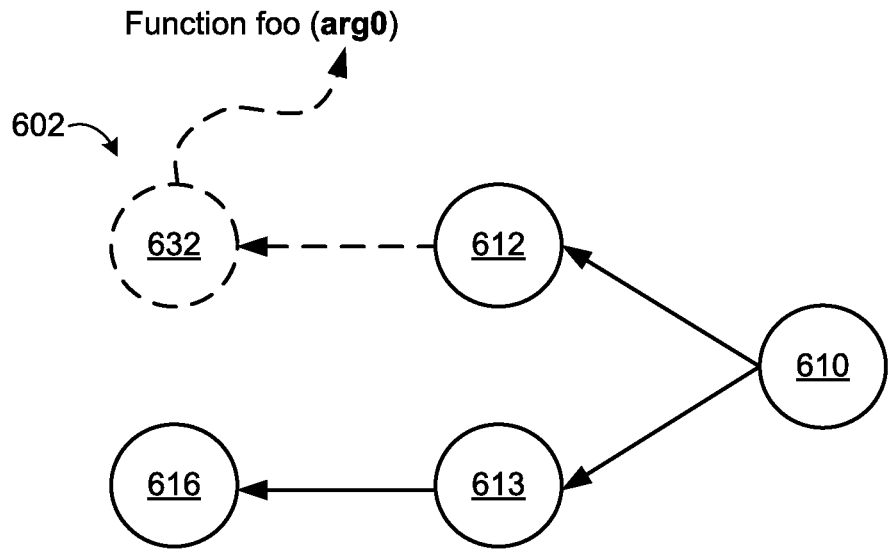
FIG. 6D depicts an example of a sub-graph having an input parameter dependency.

FIG. 6D illustrates a function that has been created from the sub-graph 602 of FIG. 6C. In the FIG. 6D example, the pseudo component 632 has a logical dependency on an argument (arg0) of the function "foo," which may represent an encapsulation of the sub-graph 602.

Figure 6E:
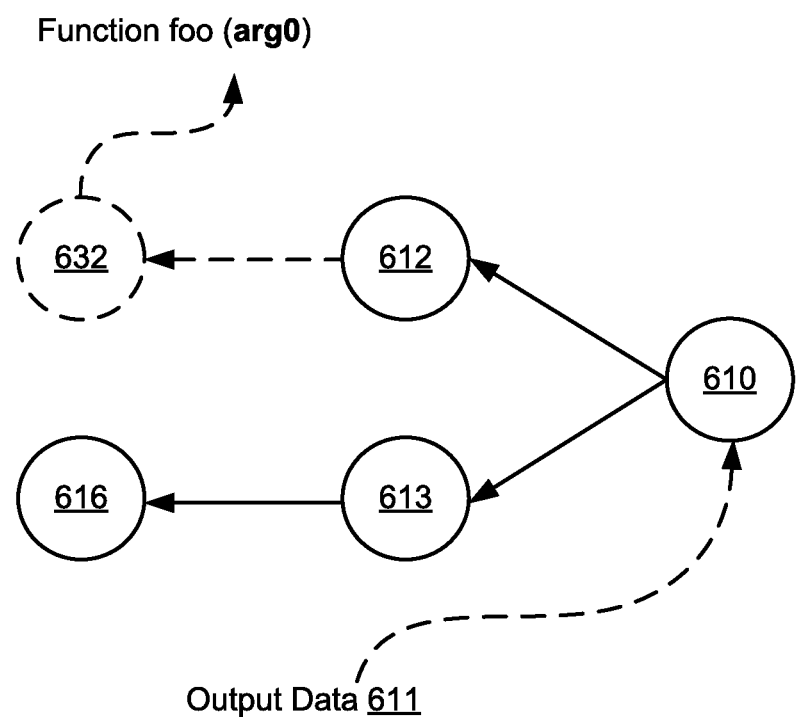
FIG. 6E depicts an example of a sub-graph configured to produce an output.

In some embodiments, a "response" or output value of the sub-graph may be returned and/or used for other processing tasks and/or of an output of a processing task. As such, an encapsulated representation of a sub-graph may be configured to capture one or more outputs of components therein and make these outputs available to the execution environment or other entity. FIG. 6E illustrates the sub-graph 602 providing output data 611, which may be made available to other entities and/or components.

Figure 6F:
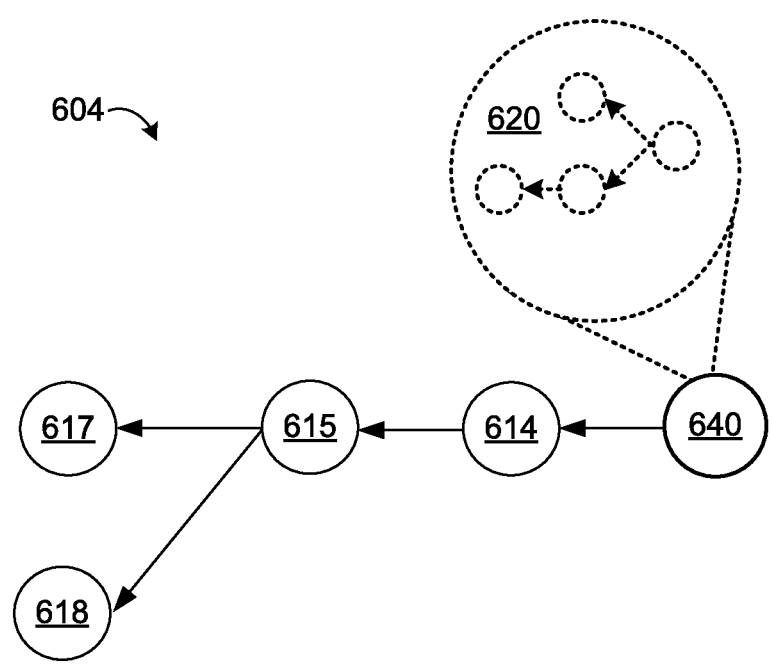
FIG. 6F depicts an example of a sub-graph within a dependency datastructure.

As discussed above, a sub-graph may be exposed as an executable code unit. Therefore, in some embodiments, a sub-graph may be encapsulated within a component. FIG. 6F illustrates a dependency datastructure 604 comprising a component 640 encapsulating the sub-graph 620 described above. In the FIG. 6F example, execution of the component 640 causes the sub-graph 620 encapsulated within component 640 to be executed, resulting in a hierarchical or recursive execution of dependency datastructures and/or sub-graphs.

As described above, representing processing tasks as components of a dependency datastructure allows an execution environment (or other entity) to identify and exploit concurrency. In addition, the representations may simplify code development by offloading concurrency related tasks and/or encapsulating code units into separable components.

The following example illustrates how the systems and methods taught herein simplify the complexity of processing task implementations. In this example, a set of processing functions (or methods) are defined using JavaScript. However, the disclosure is not limited in this regard and could be implemented in conjunction with any suitable programming language or environment.

```
var asyncGetRandomNum = function(callback) {
    setTimeout(function( ) {
        var num = Math.ceil(Math.random( ) * 100)
        callback(null, num);
    }, 250);
};
var asyncDoubler = function(num, callback) {
```

-continued

```
        setTimeout(function( ) {
            callback(null, num * 2);
        }, 250);
    };
    var asyncAdder = function(num1, num2, callback) {
        setTimeout(function( ) {
            callback(null, num1+num2);
        }, 250);
    };
```

A processing task is defined as follows:
1. Accept an input parameter, inValue;
2. Invoke asyncGetRandomNum;
3. Invoke asyncAdder using inValue and the result from asyncGetRandomNum of step 2;
4. Invoke asyncDoubler using the result from step asyncGetRandomNum of step 2;
5. Invoke asyncAdder using the results of asyncGetRandomNum and asyncAdder of steps 2 and 3;
6. Invoke asyncDoubler using the result of asyncAdder of step 5;
7. Invoke asyncAdder using the results of asyncDoubler of steps 4 and 6; and
8. Asynchronously return the result of asyncAdder of step 7.

In a first approach, the processing task is implemented in serial in accordance with the processing steps described above:

```
// create our function
var func = function(inValue) {
    asyncGetRandomNum(function(err, rnd0) {
        if (err) {
            callback(err);
            return;
        }
        asyncAdder(rnd0, inValue, function(err, add0) {
            if (err) {
                callback(err);
                return;
            }
            asyncDoubler(rnd0, function(err, dbl0) {
                if (err) {
                    callback(err);
                    return;
                }
                asyncAdder(rnd0, add0, function(err, add1) {
                    if (err) {
                        callback(err);
                        return;
                    }
                    asyncDoubler(add1, function(err, dbl1) {
                        if (err) {
                            callback(err);
                            return;
                        }
                        asyncAdder(dbl0, dbl1, function(err, add2) {
                            callback(err, add2);
                        });
                    });
                });
            });
        });
    });
};
// invoke the function
func(42);
```

In an alternative embodiment, portions of the processing tasks (steps 1-8) are encapsulated into individual, asynchronous code unit components. The asynchronous code units may accept a callback as a last parameter, which is used to return control when execution of the code unit is complete. Errors that occur within the asynchronous code unit are passed as a parameter of the provided callback.

Figure 7:
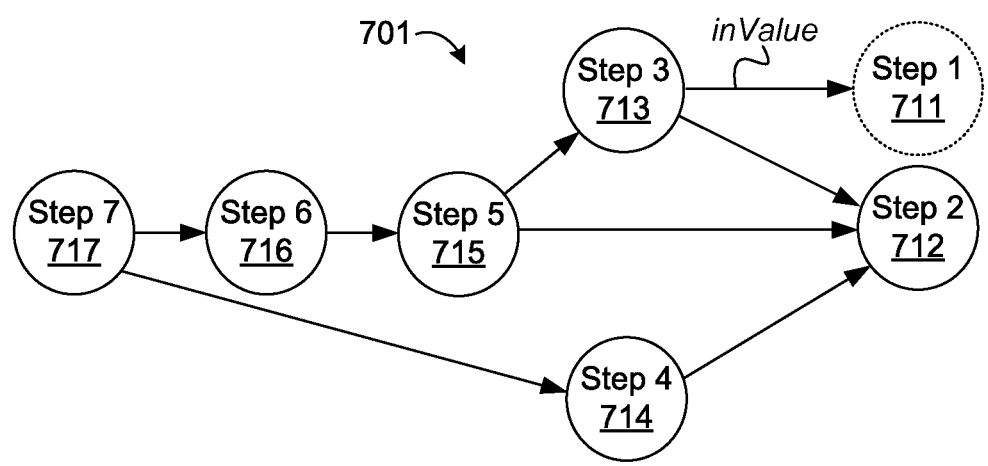
FIG. 7 depicts a dependency datastructure.

The steps of the processing task are segmented into code units (e.g., components), which are arrayed in a dependency datastructure. FIG. 7 depicts an exemplary dependency datastructure corresponding to the processing task described above. As shown in FIG. 7, the dependency datastructure 701 includes a pseudo-component 711 representing the "inValue" upon which step 3 713 depends. The datastructure 701 further includes a component 712 representing step 2, which has no dependencies. Step 4 is represented by component 714 and includes a dependency arc indicating that step 4 714 requires an output generated by Step 2 712. Step 5 is represented by component 715 and includes dependency arcs indicating dependencies on the outputs of step 2 712 and step 3 713, respectively. Step 6 is represented by component 716 and includes a dependency arc corresponding to its dependency on an output of step 5 715. Step 7 is represented by component 717 and includes dependency arcs indicating dependencies on outputs of steps 6 716 and step 4 714, respectively. Although not depicted in FIG. 7, an additional component or arc could be included to represent the output of the dependency datastructure 701 (e.g., the output of step 7 717).

The dependency datastructure may be executed within an execution environment as described above. In this example, the execution environment is referred to as a "SyncGraph" library, which may be configured to allow for defining a dependency datastructure, interpret the dependency datastructure, provide for identifying components that are ready to be executed, maintain concurrency state metadata, and so on. The following code listing provides one example of the use of "SyncGraph" to define and execute the processing task described above:

```
// create our dependency graph and extract our function
var func = new SyncGraph({
    rnd0: {func: asyncGetRandomNum},
    add0: {func: asyncAdder, dependencies: ['rnd0', '#in']},
    dbl0: {func: asyncDoubler, dependencies: ['rnd0']},
    add1: {func: asyncAdder, dependencies: ['rnd0', 'add0']},
    dbl1: {func: asyncDoubler, dependencies: ['add1']},
    add2: {func: asyncAdder, dependencies: ['dbl0', 'dbl1']}
}).createRunnable('add2', ['#in'], function(num) { return {
    '#in': [num] }; });
// invoke our function
func(42);
```

The initialization of the "SyncGraph" library follows the dependency datastructure 701 depicted in FIG. 7. The first "rnd0" entry defines step 2 of the processing task (component 712 in FIG. 7). Step 3 (component 713) is defined by the "add0" entry and includes dependencies on the output of step 2 (rnd0) and the #in input value. In FIG. 7, these dependencies are illustrated by the dependency arcs from component 713 to the pseudo-component 711 and the component 712 of step 2. The "db10" entry defines step 4 (component 714 in FIG. 7) and includes a dependency on the output of step 2 (illustrated in FIG. 7 as a dependency arc from component 714 to component 712). The "add1" entry defines step 5 of the processing task and includes dependencies on the output of steps 2 and 3. These dependencies are illustrated in FIG. 7 as dependency arcs from component 715 to components 712 and 713, respectively. The "db11" entry defines step 6 of the processing task and includes a dependency on the output of step 5 (dependency arc from component 716 to component 715). Finally, the "add2" entry defines step 7 and includes dependencies on the outputs of steps 4 and 6, respectively (dependency arcs from component 717 to components 714 and 716, respectively).

As illustrated above, the code required to implement the processing task using the execution environment (SyncGraph) is considerably simpler than the imperative approach. Moreover, the SyncGraph approach allows the execution environment to identify and exploit concurrencies in the processing task, which would otherwise be left unexploited (or would require additional, custom code to exploit). For example, once the output of step 2 is available, step 3 713 and step 4 714 could be implemented concurrently.

As described above, code units may be encapsulated within a "component," that is included within a dependency datastructure. An execution environment may access the dependency datastructure, identify concurrencies therein, and execute the components. The disclosure is not limited in this regard, however, and could be implemented using any suitable mechanism including, but not limited to: an interface, such as an Application Programming Interface, an object interface, or the like, a service description, such as Simple Object Access Protocol (SOAP), Web Services Description Language (WSDL), or the like, function prototypes, or the like. An execution environment may be configured to interpret and/or execute components implemented using one or more encapsulation mechanisms (e.g., on one or more execution platforms). The execution platforms may include, but are not limited to: threads, processes, virtual machines (e.g., a Java™ virtual machine), script interpreters (e.g., a JavaScript interpreter), a native execution platform, an emulated execution platform, or the like. The execution environment may comprise one or more execution platforms configured to execute components implemented using different encapsulation mechanisms. For example, the execution environment may be configured to execute a first component comprising a Java™ bytecode code unit on a Java virtual machine execution platform, a component comprising a JavaScript code unit using a script interpreter, and another component comprising a "native" code unit, and so on. Accordingly, the execution platforms may include, but are not limited to: threads, processes, virtual machines (e.g., a Java™ virtual machine), script interpreters (e.g., a JavaScript interpreter), a native execution platform, an emulated execution platform, or the like.

Figure 8:
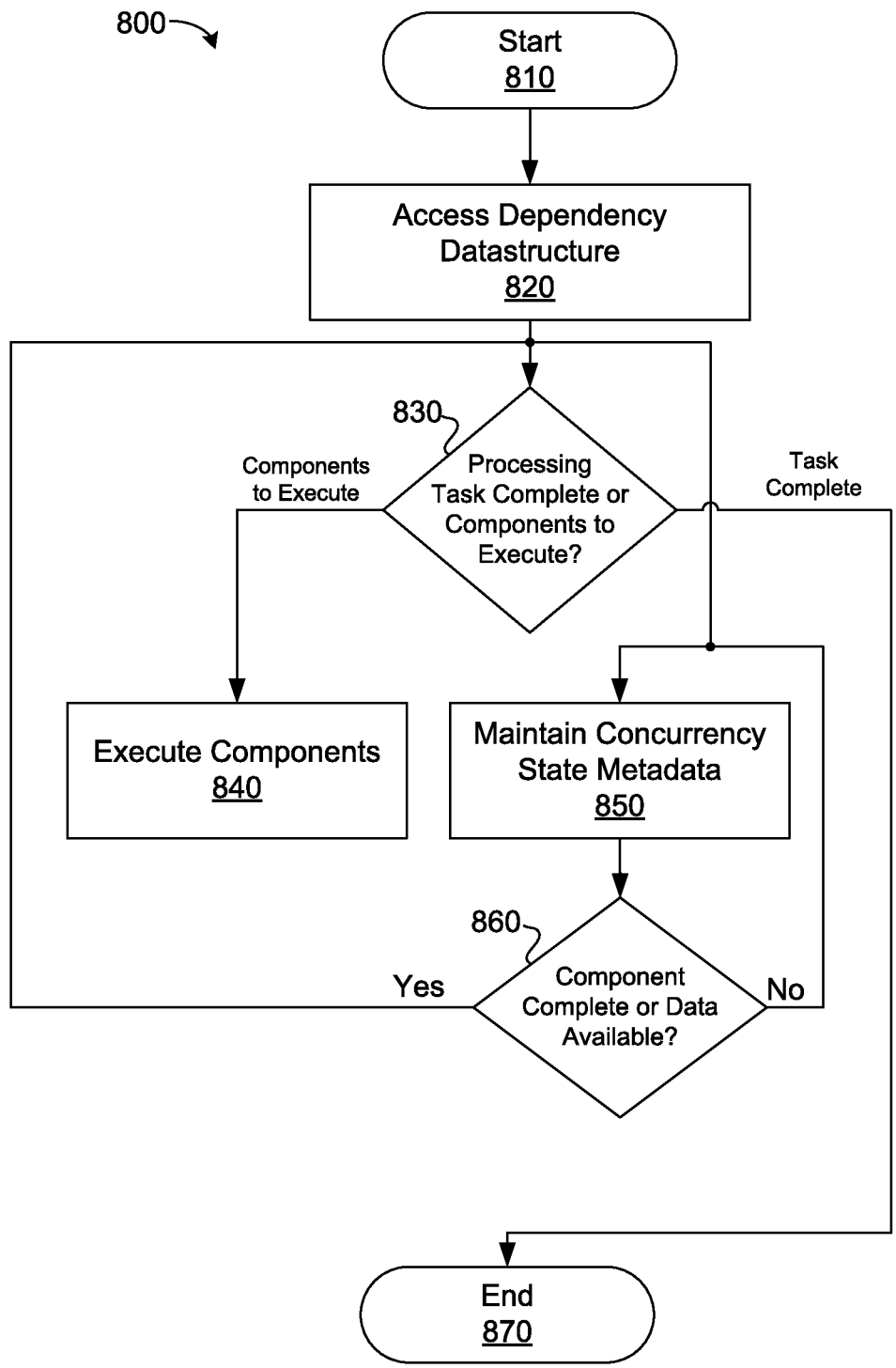
FIG. 8 is a flow diagram of one embodiment of a method for concurrent processing.

FIG. 8 is a flow diagram of one embodiment of a method 800 for exploiting processing task concurrency.

At step 810, the method 800 starts and is initialized. Step 810 may comprise loading one or more machine-readable instructions from a non-transitory, machine-readable storage medium, such as a hard disk, non-volatile memory, or the like. Step 810 may further comprise accessing and/or initializing processing resources, execution environments, and/or virtual machine resources.

Step 820 comprises accessing a dependency datastructure comprising a plurality of components. One or more of the components may encapsulate a unit of executable code (code unit). In some embodiments, the dependency datastructure comprises one or more pseudo-components, representing external dependencies. The dependency datastructure may further comprise dependency arcs representing component dependencies, as described above.

Step 830 comprises identifying components that are ready to be executed. In some embodiments, step 830 comprises traversing the dependency datastructure accessed at step 820 to identify leaf components (components whose dependencies are satisfied and/or components that have no dependencies). Alternatively, or in addition, step 830 may comprise accessing concurrency state metadata indicating which components have been executed (if any) and/or identifying inputs and/or outputs that have become available due to execution of a component and/or an external pseudo component. Step 830 may comprise identifying a plurality of components that can be executed in parallel.

Step 830 may further comprise determining that the processing task defined in the dependency datastructure of step 820 has been completed (e.g., all components have been executed and/or all required outputs have been produced). If step 830 indicates that the processing task is complete, the flow continues to step 870; otherwise, if additional components remain to be executed, the flow continues to step 840.

At step 840, an execution environment executes the identified components. The execution of step 840 may comprise executing the identified components concurrently (e.g., in parallel) and/or in serial. In some embodiments, executing a component comprises providing the component with one or more inputs and/or registering a callback (or other synchronization mechanism) that is invoked when the component completes execution. The callback mechanism may allow for output passing and/or error handling, as described above. In some embodiments, step 840 comprises selecting one of a plurality of different execution platforms or environments for the component (e.g., Java™ virtual machine, JavaScript interpreter, etc.).

Step 850 comprises maintaining concurrency metadata pertaining to the dependency datastructure access at step 820. Accordingly, step 850 may comprise accessing output data generated by executing the components at step 840 and/or provided from external sources (e.g., pseudo components). Step 850 may further comprise storing or caching the output data for use as input data of other components in the dependency datastructure and/or as an output of the processing task of the dependency datastructure. In some embodiments, the output/input data may be cached and/or stored as part of the concurrency metadata described above.

In some embodiments, step 850 operates asynchronously from the execution of the components at step 840 (e.g., step 850 may be implemented in a separate thread or process from the execution of the components at step 840). The asynchronous execution may allow the method 800 to detect completion of the components and/or identify new, external inputs being available more quickly. Accordingly, step 850 may be depicted as operating concurrently with step 840.

Step 860 comprises determining that a component has completed execution and/or that one or more input data values have been received. If so, the flow continues at step 830 where additional components available to be executed are identified, as described above; otherwise, the flow continues at step 850. Since steps 840, 850 and/or 860 may operate asynchronously relative to one another, new components may be identified as being available for execution as soon as the dependencies thereof are satisfied, and without waiting for the execution of earlier invoked components to complete.

The method continues back at step 830 where the dependency datastructure and the updated concurrency state metadata are used to identify one or more additional components available for execution and/or to determine whether the processing task has been completed (e.g., whether all components in the dependency datastructure have been executed), as described above.

At step 870, the flow ends until a next processing task and/or dependency datastructure is received, at which point the flow continues at step 820.

Figure 9:
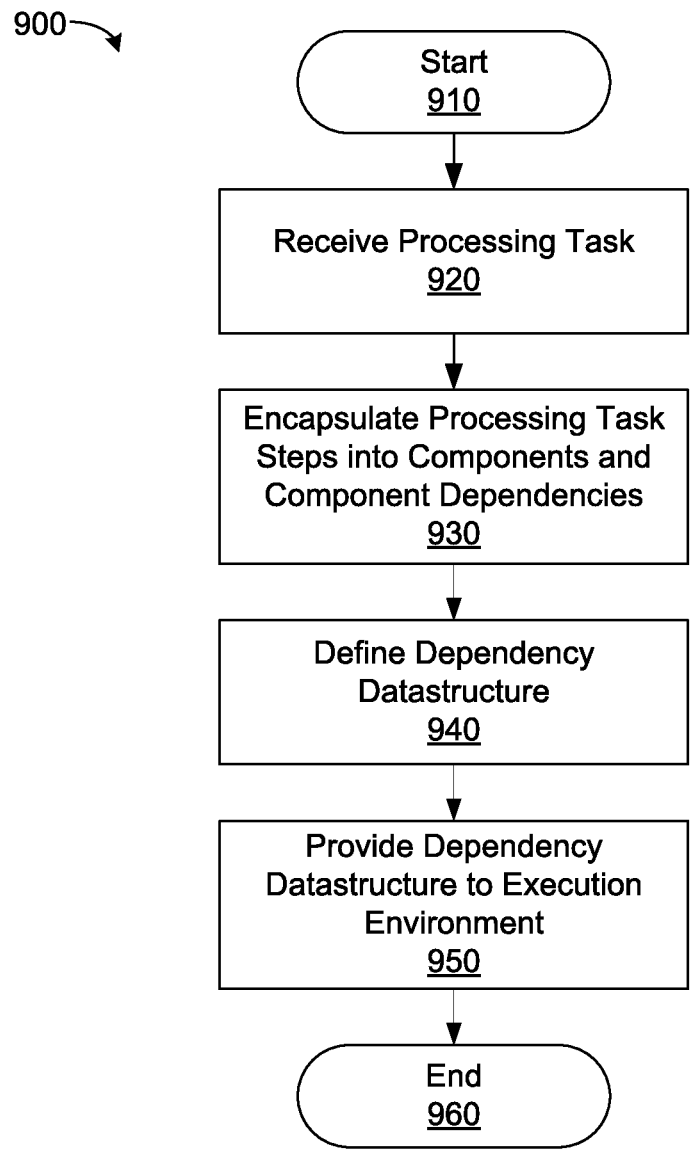
FIG. 9 is a flow diagram of one embodiment of another method for concurrent processing.

FIG. 9 is a flow diagram of one embodiment of a method 900 for concurrent task processing.

At step 910, the method 900 starts and is initialized as described above.

At step 920, a processing task is received. The processing task may comprise one or more processing steps, which are implemented by one or more respective code units.

Step 930 comprises defining a dependency datastructure to implement the processing task of step 920. Step 930 may comprise segmenting the processing task into one or more components, each component corresponding to a portion of the processing task and being associated with a code unit thereof. Each component may, therefore, encapsulate a respective code unit and provide for execution of the code unit within an execution environment. Step 930 may further comprise defining dependencies between the components as described above.

Step 940 comprises defining a dependency datastructure comprising the components of step 930. Step 940 may further comprise defining dependency arcs between the components, each dependency arc corresponding to a dependency between the components.

At step 950, the dependency datastructure is provided to an execution environment, which executes the processing task using the dependency datastructure as described above in conjunction with FIG. 8.

At step 960, the method 900 ends until a next processing task is received at step 920.

Figure 10:
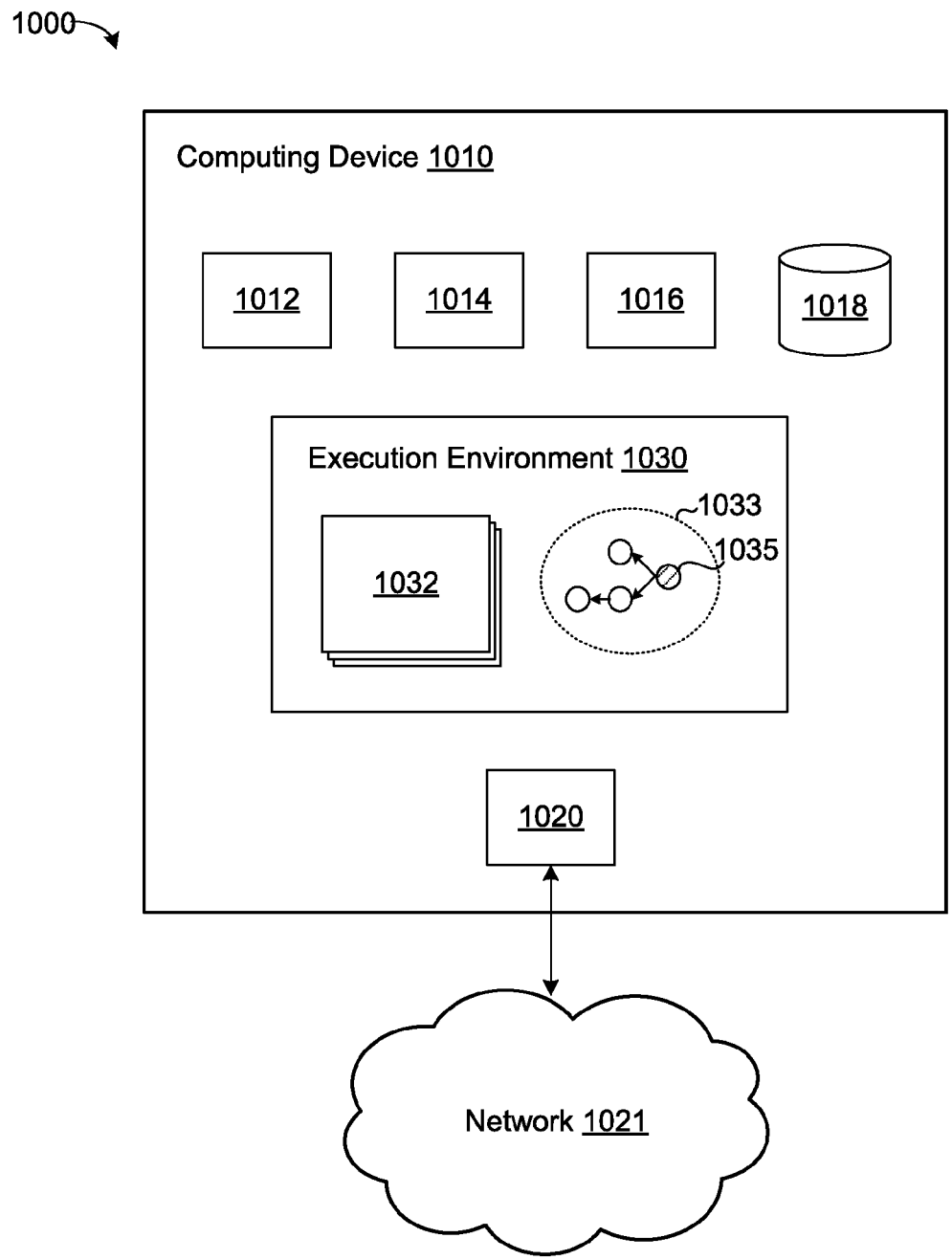
FIG. 10 is a block diagram of a system for concurrent processing.

FIG. 10 is a block diagram of one embodiment of a system 1000 for concurrent processing. The system 1000 includes a computing device 1010, which may comprise a processor 1012, memory 1014, human-machine interface devices 1016 (e.g., display, keyboard, mouse, speakers, etc.), and/or non-transitory, machine-readable media 1018. The computing device 1010 may further comprise one or more communication interfaces 1020, such as network interfaces, input/output devices, or the like, to communicatively couple to the computing device 1010 to a network 1021.

An execution environment 1030 operates on the computing device 1010. The execution environment 1030 may be embodied as one or more instructions stored on the non-transitory, machine-readable storage medium 1018. The execution environment 1030 may comprise one or more execution platforms 1032, which may include but are not limited to: threads, processes, virtual machines (e.g., a Java™ virtual machine), script interpreters (e.g., a JavaScript interpreter), a native execution platform, an emulated execution platform, or the like.

The execution environment 1030 may be configured to implement a processing task. In some embodiments, the execution environment 1030 (or other tool) provides for defining dependency datastructures to implement processing tasks (e.g., as described above in conjunction with FIG. 9). In some embodiments, a dependency datastructure 1033 may be stored on a non-transitory, machine-readable storage medium, such as the medium and/or loaded into the memory 1016 for execution by the execution environment 1030.

The execution environment 1030 may be configured to execute a processing task by accessing the dependency datastructure 1033 corresponding to the task in the machine-readable storage media 1018 or another source (e.g., a network connection, human-machine interface device 1016, or the like). The execution environment 1030 identifies components that are available for execution using the dependency datastructure and/or concurrency state metadata 1035, as described above. In some embodiments, the execution environment 1030 executes a plurality of components of the dependency datastructure 1033 concurrently (e.g., in parallel). The components may be executed in one or more execution platforms or environments 1032.

The execution environment 1030 maintains concurrency state metadata 1035 indicating which components have been executed and/or identifying input/output data availability. The execution environment 1030 uses the concurrency state metadata 1035 and/or the dependency datastructure to identify components whose dependencies are satisfied and are available for execution. The execution environment 1030 continues executing components of the dependency datastructure (and maintaining the concurrency metadata 1035) until the processing task is compete (e.g., a desired output is obtained and/or all components of the dependency datastructure 1033 have been executed).

One or more outputs of the processing task of the dependency datastructure 1033 may be stored on a machine-readable storage medium 1018, transmitted on the network 1021 (via the network interface 1020), and/or presented to a user on a human-machine interface device 1016.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a non-transitory, machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or machine-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

We claim:

1. A computer-implemented method for highly concurrent processing, comprising:
a computing device performing the steps of:
accessing a dependency data structure comprising:
a plurality of components, each component representing a respective code unit that is executable by a computing system,
an explicit pseudo component representing a dependency to be satisfied by an external processing system, and
a plurality of dependency arcs connecting the components and the explicit pseudo component, each dependency arc representing a dependency to be satisfied in order to execute a corresponding component in the dependency data structure, including dependency arcs from the explicit pseudo component to a set of two or more of the components;
updating the dependency data structure in response to one or more of determining that a component has been executed by the component system, and determining that the explicit pseudo component has been satisfied by the external processing system;
identifying components in the dependency data structure that are available to be executed based on the updated dependency data structure, wherein the two or more components are identified as available to be executed in response to updating the dependency data structure to indicate that the explicit pseudo component has been satisfied by the external processing system; and
executing the identified components concurrently.

2. The method of claim 1, further comprising updating the dependency data structure responsive to executing the identified components.

3. The method of claim 2, further comprising caching an output generated by executing components of the dependency data structure.

4. The method of claim 1, wherein the dependency data structure is updated upon receiving an external input generated from outside of the computing system, wherein the external input is not generated by executing a component of the dependency data structure and corresponds to the explicit pseudo component.

5. The method of claim 1, wherein a component is available to be executed in response to determining that all dependencies of the component are satisfied.

6. The method of claim 1, further comprising:
updating the dependency data structure responsive to executing the identified components; and
identifying components of the updated dependency data structure that are available to be executed and executing the identified components in response to the updating until each component in the dependency data structure has been executed.

7. The method of claim 1, further comprising:
updating the dependency data structure responsive to executing the identified components; and
identifying components of the updated dependency data structure that are available to be executed and executing the identified components in response to updating until an output result of the dependency data structure is generated.

8. The method of claim 1, wherein execution of the dependency data structure generates an output result, the method further comprising one of displaying the output result to a user on a human-machine interface device, transmitting the output result on a network, and storing the output result on a non-transitory computer-readable storage medium.

9. The method of claim 1, wherein the identified components are executed using an execution platform, and wherein the execution platform is one of: a virtual machine, a thread, a process, a script interpreter, a native execution platform, and an emulated execution platform.

10. The method of claim 1, further comprising:
encapsulating a plurality of steps of a processing task into respective components, each component comprising a respective code unit to implement one of the plurality of processing task steps;
identifying component dependencies, each component dependency representing a dependency to be satisfied in order to execute a respective one of the components; and
defining the dependency data structure comprising,
the components, and
dependency arcs interconnecting the components, each dependency arc representing a respective identified component dependency.

11. The method of claim 10, wherein one of the identified component dependencies corresponds to the explicit pseudo component.

12. A non-transitory computer-readable storage medium comprising instructions to cause a computing device to perform a method for highly concurrent processing, the method comprising:
accessing a dependency data structure comprising,
a plurality of components, each component representing a respective code unit that is executable by a processing system,
an explicit pseudo component representing an external dependency to be satisfied by an external processing system, and
a plurality of dependency arcs connecting the components and the explicit pseudo component, each dependency arc representing a dependency to be satisfied in order to execute a corresponding component in the dependency data structure, including dependency arcs from the explicit pseudo component to a set of two or more of the components;
removing one or more of a component from the dependency data structure in response to determining that the component has been executed, and the explicit pseudo component in response to determining that the explicit pseudo component has been completed by the external processing system;
identifying a plurality of components in the dependency data structure that are available to be executed based on the updated dependency data structure, wherein the two or more components are identified as available to be executed in response to updating the dependency data structure to indicate that the explicit pseudo component has been satisfied by the external processing system; and executing the plurality of identified components concurrently.

13. The non-transitory computer-readable storage medium of claim 12, the method further comprising:

updating the dependency data structure responsive to executing the plurality of identified components; and caching a component generated output.

14. The non-transitory computer-readable storage medium of claim 12, the method further comprising updating the dependency data structure upon receiving an external input from outside of the dependency data structure, wherein the external input is not generated by executing a component of the dependency data structure.

15. The non-transitory computer-readable storage medium of claim 12, the method further comprising:

updating the dependency data structure upon satisfying dependencies within the dependency data structure by one of executing a component within the dependency data structure and receiving an external input;

identifying additional components that are available to be executed in response to updating the dependency data structure; and executing the additional components concurrently.

16. The non-transitory computer-readable storage medium of claim 15, the method further comprising:

updating the dependency data structure, identifying additional components that are available to be executed in response to the updating, and executing the additional components concurrently until an identified output result of the dependency data structure is generated; and displaying the identified output result to a user on a human-machine interface device, transmitting the identified output result on a network, and storing the identified output result on a non-transitory computer-readable storage medium.

17. The non-transitory computer-readable storage medium of claim 12, wherein the identified components are executed using an execution platform, and wherein the execution platform is one of: a virtual machine, a thread, a process, a script interpreter, a native execution platform, and an emulated execution platform.

18. The non-transitory computer-readable storage medium of claim 12, the method further comprising:

encapsulating a plurality of steps of a processing task into respective components, each component comprising a respective code unit to implement one of the plurality of processing task steps;

identifying component dependencies, each component dependency representing a dependency to be satisfied in order to execute a respective one of the components; and defining the dependency data structure comprising, the components, and dependency arcs interconnecting the components, each dependency arc representing a respective identified component dependency.

19. A computing device to perform a method for highly concurrent processing, comprising:

a memory;

a processor; and an execution environment operating on the processor, wherein the execution environment is configured to, access a dependency data structure stored on the memory and comprising, a plurality of components, each component representing a respective executable code unit, an explicit pseudo component representing an external dependency to be completed by an external processing system, and a plurality of dependency arcs connecting the components and the explicit pseudo component, each dependency arc representing a dependency to be satisfied in order to execute a corresponding component in the dependency data structure, including dependency arcs from the explicit pseudo component to a set of two or more of the components;

update the dependency data structure by one or more of removing a component from the dependent data structure in response to completing execution of the component, and removing the explicit pseudo component in response to determining that the explicit pseudo component has been completed by the external processing system; and identify a component in the dependency data structure that is available to be executed based on the updated dependency data structure, wherein the two or more components are identified as available to be executed in response to updating the dependency data structure to indicate that the explicit pseudo component has been satisfied by the external processing system.

* * * * *